United States Patent
Lee et al.

(10) Patent No.: US 10,637,237 B2
(45) Date of Patent: Apr. 28, 2020

(54) POWER SWITCH CIRCUIT AND POWER CIRCUIT WITH THE SAME

(71) Applicant: GREEN SOLUTION TECHNOLOGY CO., LTD., New Taipei (TW)

(72) Inventors: Li-Min Lee, New Taipei (TW); Zhong-Wei Liu, Wuxi (CN); Shian-Sung Shiu, New Taipei (TW); Yong-Heng Jiang, Wuxi (CN)

(73) Assignee: Green Solution Technology Co., Ltd., New Taipei (TW)

( * ) Notice: Subject to any disclaimer, the term of this patent is extended or adjusted under 35 U.S.C. 154(b) by 367 days.

(21) Appl. No.: 15/448,234

(22) Filed: Mar. 2, 2017

(65) Prior Publication Data

US 2017/0346284 A1    Nov. 30, 2017

(30) Foreign Application Priority Data

May 26, 2016    (CN) .......................... 2016 1 0357252

(51) Int. Cl.
| | |
|---|---|
| *H02J 1/00* | (2006.01) |
| *G06F 1/26* | (2006.01) |
| *H02M 1/32* | (2007.01) |
| *H02M 3/07* | (2006.01) |

(52) U.S. Cl.
CPC ................. *H02J 1/00* (2013.01); *G06F 1/26* (2013.01); *H02M 1/32* (2013.01); *H02M 3/07* (2013.01)

(58) Field of Classification Search
CPC ... H02J 1/00; G06F 1/26; H02M 1/32; H02M 3/07

USPC .......................................................... 307/127
See application file for complete search history.

(56) References Cited

U.S. PATENT DOCUMENTS

| 4,731,574 A * | 3/1988 | Melbert .................. G05F 1/573 323/275 |
| 5,375,029 A | 12/1994 | Fukunaga et al. |
| 2002/0130645 A1 * | 9/2002 | Tsai .......................... G05F 1/24 323/274 |
| 2006/0208773 A1 | 9/2006 | Logiudice |

(Continued)

FOREIGN PATENT DOCUMENTS

| CN | 203747365 U | 7/2014 |
| CN | 103166442 B | 5/2016 |
| TW | I229500 B | 3/2005 |

(Continued)

*Primary Examiner* — Rexford N Barnie
*Assistant Examiner* — Joseph N Inge
(74) *Attorney, Agent, or Firm* — Muncy, Geissler, Olds & Lowe, P.C.

(57) ABSTRACT

This invention provides a power switch circuit and a power circuit using the power switch circuit. In particular, the power switch circuit includes a first reverse current monitoring circuit and a second reverse current monitoring circuit. The first reverse current monitoring circuit is coupled to a power transistor, and is configured to detect whether a reverse current flows through the power transistor to a voltage input terminal for a predetermined period of time, and only if yes, turn off the power transistor. The second reverse current monitoring circuit is coupled to the power transistor, and is configured to detect whether a reverse current flows through the power transistor to the voltage input terminal, and if yes, turn off the power transistor immediately.

15 Claims, 10 Drawing Sheets

(56) References Cited

U.S. PATENT DOCUMENTS

2008/0285191 A1* 11/2008 Ueda .................... H02H 11/003
           361/82
2011/0085274 A1* 4/2011 Jarman ................ H02H 3/0935
           361/93.4

FOREIGN PATENT DOCUMENTS

| TW | I335704 B | 1/2011 |
| TW | I355801 B | 1/2012 |
| TW | I369057 B | 7/2012 |
| TW | I369828 B | 8/2012 |

* cited by examiner

POWER SWITCH CIRCUIT AND POWER CIRCUIT WITH THE SAME

BACKGROUND OF THE INVENTION

1. Field of the Invention

The present invention relates to a power circuit with a power switch circuit, and more particularly to a power circuit with a power switch circuit that offers protection against undesired reverse current.

2. Description of the Related Art

One simplest type of power switch circuit 9 is illustrated in FIG. 1, which generally includes a power transistor 90 and a charge pump 91 (or any other types of control circuit). The charge pump 91 is provided to control the operation of the power transistor 90 to allow the power source (not shown) coupled to the voltage input terminal Vin to supply power to the load (not shown) coupled to a voltage output terminal Vout. Such type of power switch circuit 9 is well known in the art and can be found in Taiwan Patent Nos. I229500, I355801 or China Patent No. 203747365U, for example. Moreover, the power switch circuit 9 may also be applied in a USB port for controlling the power supply of an USB power source to a USB external device.

In some cases, two or more power switch circuits 9 together are employed to control two or more power sources to supply power to a load. For example, in a system that is compliant to a USB power delivery, there are three power sources that supplies voltages of 5V, 12V and 20V respectively to supply power through the power switch circuit to a USB connector and, more specifically, to an external USB device that is electrically connected to the USB connector.

As shown in FIG. 2, the two power switch circuits 9 have two voltage input terminals Vin1, Vin2 respectively coupled to two power sources (not shown), and a voltage output terminal Vout coupled to a load (not shown). The two power switch circuits 9 together provide control over the power transfer between the power sources and the load. The voltages that the two power sources provide may be identical or not as required. Consider the latter for example. The first power source with a voltage of 5V is connected to the Vin 1 while the second power source with a voltage of 6V is connected to the Vin 2. With reference to FIGS. 2 and 3, at the beginning the first power transistor 90 (M1) is in the ON-state while the second power transistor 90 (M2) is in the OFF-state, under the control of the two charge pumps 91. At this time, the first power source, which is connected to the first voltage input terminal Vin1, supplies power through the power transistor 90 (M1) to the load, and thus the output voltage magnitude Vo on the voltage output terminal Vout is slightly less than or equal to the input voltage magnitude V1 on the first voltage input terminal Vin1. Later, at time T1, the second power transistor 90 (M2) is turned ON. At this moment, since the input voltage magnitude V2 on the second voltage input terminal Vin2 is higher than the input voltage magnitude V1, the current may flow from the second power source, which serves as a high voltage side, through the second voltage input terminal Vin2, the power transistor 90 (M2), the voltage output terminal Vout, the power transistor 90 (M1), the first voltage input terminal Vin1, and finally to the first power source, which serves as a low voltage side. Accordingly, the input voltage magnitude V1 on the first voltage input terminal Vin1 rises, and meanwhile the output voltage magnitude Vo on the voltage output terminal Vout also rises due to the powering of the second power source. In contrast, the input voltage magnitude V2 on the second voltage input terminal Vin2 drops because the second power source may supply power to the first voltage input terminal Vin1.

As shown in the aforementioned power switch circuits 9, a reverse current may occur as long as the two power sources supplies different voltages, and the reverse current may cause a damage to the interior electronic components of the power source at the low voltage side.

SUMMARY OF THE INVENTION

Accordingly, it is an object of the present invention to provide a power switch circuit to obviate or at least alleviate the aforementioned problem.

Briefly described, the power switch circuit of this invention includes a voltage input terminal, a voltage output terminal, a power transistor, a control logic, a first reverse current monitoring circuit, and a second reverse current monitoring circuit. The voltage input terminal is provided to be coupled to a power source. The voltage output terminal is provided to be coupled to a load. The power transistor is operatively connected between the voltage input terminal and the voltage output terminal. The control logic is coupled to the power transistor for controlling operation of the power transistor so as to have the power source supply power to the load via the power transistor. The first reverse current monitoring circuit is coupled to the power transistor and is configured to detect whether a reverse current flows through the power transistor to the voltage input terminal for a predetermined period of time; and if yes, the first reverse current monitoring circuit turns off the power transistor. The second reverse current monitoring circuit is coupled to the power transistor and is configured to detect whether a reverse current flows through the power transistor to the voltage input terminal; and if yes, the second reverse current monitoring circuit immediately turns off the power transistor. Moreover, the second reverse current monitoring circuit detects a larger reverse current than does the first reverse current monitoring circuit.

In one embodiment, the power transistor has two connecting terminals (such as source (S) and drain (D) terminals of a MOSFET) respectively coupled to the voltage input terminal and the voltage output terminal. The first reverse current monitoring circuit includes a first comparator and a time-delay circuit. The first comparator has a first input coupled to receive a first voltage on the voltage output terminal, a second input coupled to receive a second voltage on the voltage input terminal, and a single-ended output coupled to an input of the time-delay circuit. The first comparator compares the first voltage to the second voltage, and sends a reverse current indicator to the time-delay circuit only when a voltage difference between the first and second voltages is larger than a first predetermined voltage value and therefore is identified. by the first comparator. The time-delay circuit has an output coupled to a control terminal of the power transistor (such as a gate (G) terminal of a MOSFET), and only when the first comparator persists outputting the reverse current indicator for the predetermined period of time, the time-delay circuit sends a shutdown signal to the control terminal of the power transistor to turn off the power transistor.

Moreover, the second reverse current monitoring circuit includes a second comparator that has a first input coupled to receive a first voltage on the voltage output terminal, a second input coupled to receive a second voltage on the voltage input terminal, and a single-ended output coupled to the control terminal of the power transistor. The second comparator compares the first voltage to the second voltage, and outputs an OFF signal via its output to the control terminal of the power transistor to turn off the power transistor only when a voltage difference between the first and second voltages is larger than a second predetermined voltage value and therefore is identified by the second comparator. Additionally, the second predetermined voltage value is larger than the first predetermined voltage value.

In an alternative embodiment, the power transistor has two connecting terminals respectively coupled to the voltage input terminal and the voltage output terminal. The first reverse current monitoring circuit includes a current detecting circuit, a first current sensing circuit, and a time-delay circuit. The current detection circuit is coupled to the power transistor for detecting a current flowing through the power transistor. The first current sensing circuit has an input coupled to the current detection circuit and an output coupled to an input of the time-delay circuit. The first current sensing circuit sends a reverse current indicator to the time-delay circuit only when the current flowing through the power transistor to the voltage input terminal is detected by the current detection circuit and is larger than a first preset current value. The time-delay circuit has an output coupled to a control terminal of the power transistor and only when the first current sensing circuit persists outputting the reverse current indicator for the predetermined period of time, the time-delay circuit sends a shutdown signal to the control terminal of the power transistor to turn off the power transistor.

Moreover, the second reverse current monitoring circuit includes a second current sensing circuit that has an input coupled to the current detection circuit, and an output coupled to the control terminal of the power transistor. The second current sensing circuit sends an OFF signal to the control terminal of the power transistor to turn off the power transistor only when the current flowing through the power transistor to the voltage input terminal is detected by the current detection circuit and is larger than a second preset current value. Additionally, the second preset current value which can be identified by the second current sensing circuit of the second reverse current monitoring circuit is larger than the first preset current value which can be identified by the first current sensing circuit of the first reverse current monitoring circuit.

Preferably, the power switch circuit may further includes a overvoltage protection circuit that is operatively connected between the voltage input terminal and a control terminal of the power transistor. The overvoltage protection circuit is configured to turn off the power transistor only when an input voltage magnitude on the voltage input terminal is detected to be larger than a preset upper limit of voltage value.

The present invention is further directed to a power circuit utilizing at least two of the power switch circuits each of which is as recited above. Specifically, the voltage input terminal of the first power switch circuit is to be coupled to a first power source while the voltage input terminal of the second power switch circuit is to be coupled to the second power source. Besides, the voltage output terminals of the two power switch circuits are joined together to be coupled to a load.

In an alternative embodiment, the power circuit includes a first power switch circuit as recited above and a second power switch circuit which may not be identical to the first switch circuit. The voltage input terminal of the first power switch circuit is to be coupled to a first power source while the voltage input terminal of the second power switch circuit is to be coupled to a second power source. Besides, the voltage output terminal of the first power switch circuit and a voltage output terminal of the second power switch are joined together to be coupled to a load.

As described above, the present invention can actively block a reverse current at once, and therefore protect the interior electronic components of the power source at the low voltage side from the damage of the reverse current.

The foregoing and other objectives, features, and advantages of the invention will be more readily understood upon consideration of the following detailed description of the invention, taken in conjunction with the accompanying drawings.

DETAILED DESCRIPTION OF EMBODIMENTS

Figure 1:
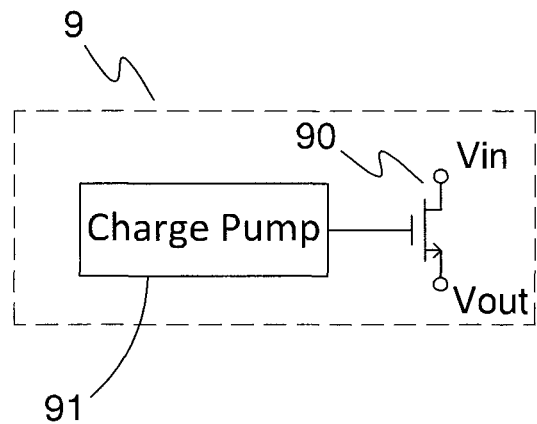
FIG. 1 is a block diagram of a prior art power switch circuit.
Figure 2:
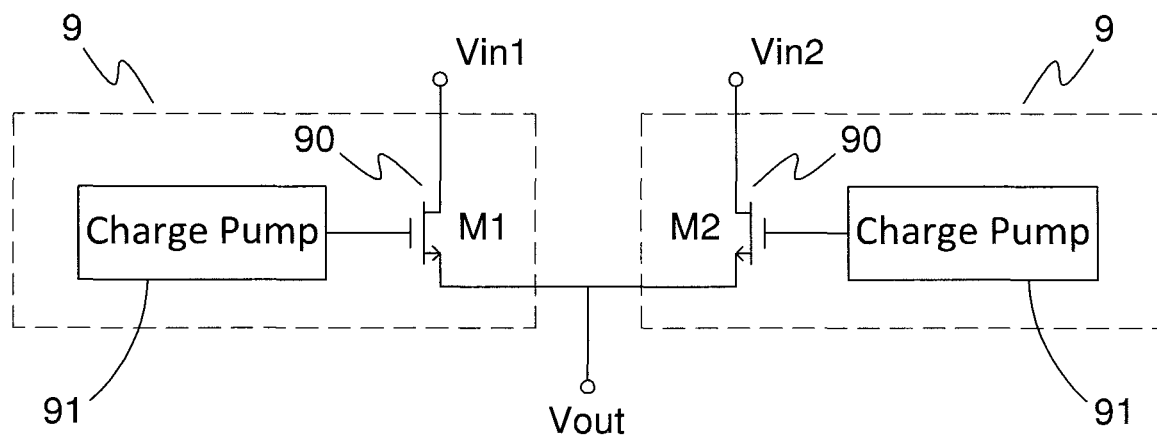
FIG. 2 is a block diagram of a prior art power supply.
Figure 3:
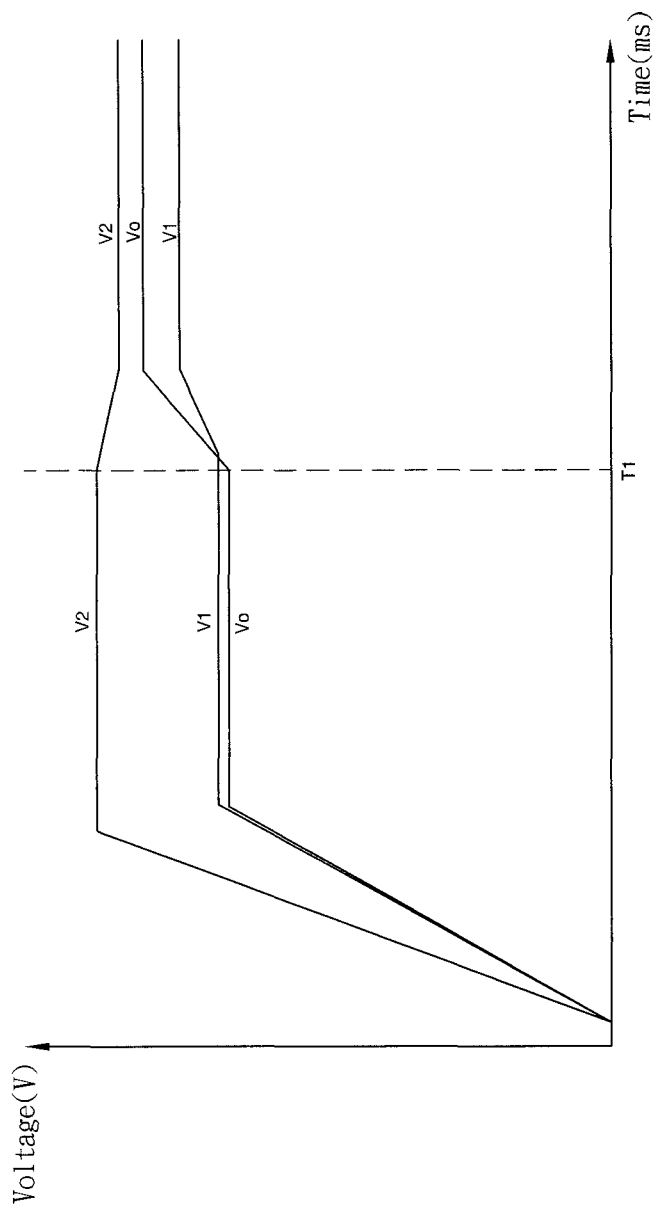
FIG. 3 is a graph of voltage vs. time in the prior art power supply shown in FIG. 2.
Figure 4:
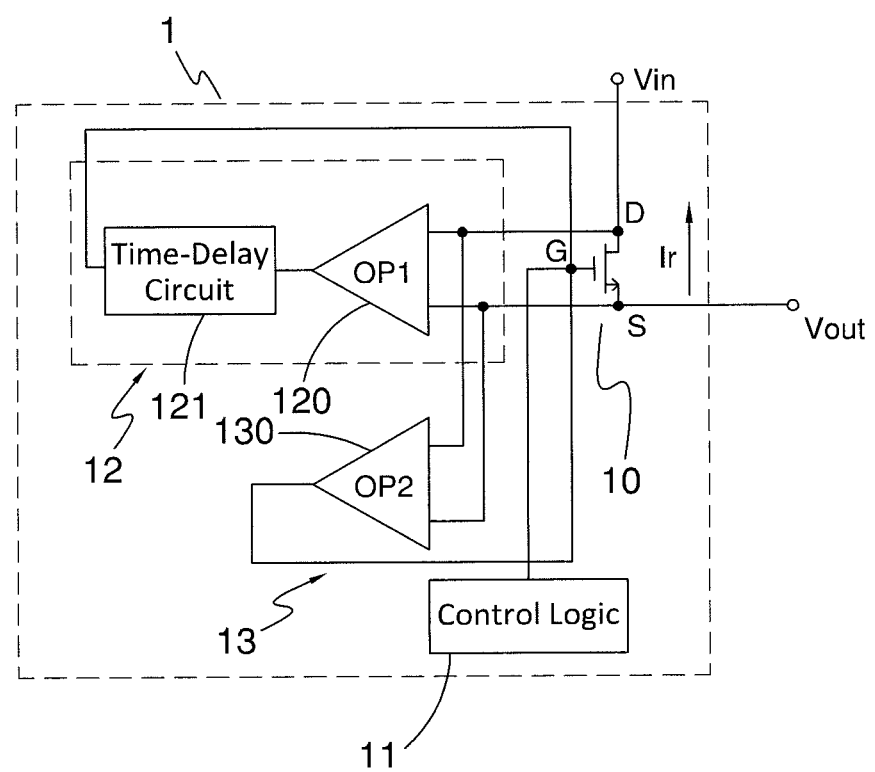
FIG. 4 is a block diagram of a power switch circuit according to a first embodiment of the present invention.

Referring to FIG. 4, there is shown a first embodiment of the power switch circuit 1, which generally includes a voltage input terminal Vin, a voltage output terminal Vout, a power transistor 10, a control logic 11, a first reverse current monitoring circuit 12, and a second reverse current monitoring circuit 13. The voltage input terminal Vin is provided to be coupled to a power source (not shown). The power source may have a voltage, for example, in a range of 5~20V. For instance, a power source that is compliant to a USB power delivery supplies a voltage of 5V, 12V or 20V. The voltage output terminal Vout is provided to be coupled to a load (not shown). The load may be an electronic component or device, such as, a capacitor, an inductor, a resistor, a cell phone, a USB flash drive or a USB portable hard drive.

The power transistor 10 is operatively connected between the voltage input terminal Vin and the voltage output terminal Vout. More specifically, the power transistor 10 has two connecting terminals D, S and a control terminal G. The two connecting terminals D, S are respectively coupled to the voltage input terminal Vin and the voltage output terminal Vout. The control logic 11 is coupled to the control terminal G of the power transistor 10 for controlling the operation of the power transistor 10 so as to have the power source supply power to the load via the power transistor 10. Specifically, the power transistor 10 may be a n-type or p-type MOSFET (NMOS or PMOS), a bipolar junction transistor (BJT) or an insulated gate bipolar transistor (IGBT), etc.

In this embodiment, the power transistor 10 is a NMOS with two connecting terminals, namely Source and Drain, and a control terminal, namely Gate. The two connecting terminals D, S of the power transistor 10 are respectively coupled to the voltage input terminal Vin and the voltage output terminal Vout while the control terminal G of the power transistor 10 is coupled to an output of the control logic 11. The control logic 11 is a charge pump, yet it is recognized that other types of control circuit may be employed to carry out the invention. For instance, if the power transistor 10 is a PMOS, the control logic 11 may be a soft-start circuit in lieu of the charge pump. In either case, the control logic 11 provides a control signal to the control terminal G of the power transistor 10 so as to control the operation of the power transistor 10, and therefore control the power transfer from the power source to the load. Moreover, the control logic 11 may adjust a duty cycle of the control signal according to the output voltage on the voltage output terminal Vout or the current flowing through the power transistor 10.

The first reverse current monitoring circuit 12 is coupled to the power transistor 10 and is configured to detect whether there exists a reverse current Ir that is large enough and flows through the power transistor 10 to the voltage input terminal Vin for a predetermined period of time. If yes, the first reverse current monitoring circuit 10 will turn off the power transistor 10 to stop the reverse current Ir from further flowing in the voltage input terminal Vin, thereby protecting the interior electronic components of the power source from being damaged.

In this embodiment, the first reverse current monitoring circuit 12 includes a first comparator 120 (OP1) and a time-delay circuit 121. The first comparator 120 has a first input coupled to receive a first voltage on the voltage output terminal Vout, a second input coupled to receive a second voltage on the voltage input terminal Vin, and a single-ended output coupled to an input of the time-delay circuit 121. The first comparator 120 compares the first voltage to the second voltage, and sends a reverse current indicator via the output to the time-delay circuit 121 only when a voltage difference between the first and second voltages is larger than a first predetermined voltage value and therefore is identified by the first comparator 120. The time-delay circuit 121 has an output coupled to the control terminal G of the power transistor 10.

While the power transistor 10 is in the ON-state, if a voltage difference between the first and second voltages is larger than a first predetermined voltage value, such as one in the range of 20 mV to 100 mV, it means that the reverse current Ir is sufficiently large to be detected or identified. Upon the reverse current Ir is detected, the first comparator 120 sends out the reverse current indicator to the time-delay circuit 121. Upon reception of the reverse current indicator, the time-delay circuit 121 starts counting how long the reverse current indicator continues. And, only when the first comparator 120 (OP1) persists outputting the reverse current indicator for the predetermined period of time, such as 5 ms, the time-delay circuit 121 sends a shutdown signal to the control terminal G of the power transistor 10 to turn off the power transistor 10, thereby stopping the reverse current Ir from flowing in the voltage input terminal Vin, and protecting the related electronic components of the power source from being damaged.

As described above, once the first reverse current monitoring circuit 12 detects a reverse current Ir, the power transistor 10 is turned off, not immediately, but rather in a later time (after the predetermined period of time) by the time-delay circuit 121. This avoids any misjudgment of the reverse current Ir. In a case where the reverse current indicator does not last a long time, the reverse current Ir may merely be a noise or a transient current caused by any other reasons. In that case, there is no need to stop that current. The time-delay circuit 121 will not send the shutdown signal, and the power transistor 10 remains in the normal operation.

If the reverse current Ir is so small that the voltage difference between the voltage input terminal Vin and the voltage output terminal Vout is less than a first predetermined voltage value, such as 20 mV, which the first comparator 120 can notice or identify, then no reverse current indicator will be send out from the output of the first comparator 120, and therefore no reverse current indicator will be received by the time-delay circuit 121. Thus, the time-delay circuit 121 will not send out the shutdown signal to have the power transistor 10 turned off, and the extremely small reverse current Jr can still flow through the power transistor 10 to the voltage input terminal Vin. Fortunately, the reverse current Ir is too small to damage the electronic components of the power source coupled to the voltage input terminal Vin.

However, if the reverse current Ir is so large that the voltage difference between the voltage input terminal Vin and the voltage output terminal Vout is larger than a voltage value, such as 100 mV, the reverse current Ir may be too large that it can immediately damage the electronic components of the power source coupled to the voltage input terminal Vin. Thus, no matter it is a noise or any transient current caused by any other reasons, the power transistor 10 will be immediately turned off by the second reverse current monitoring circuit to protect the electronic components of the power source from damage of the reverse current Ir.

Specifically, the second reverse current monitoring circuit 13 is coupled to the power transistor 10 and is configured to detect whether a reverse current that is sufficiently large and flows through the power transistor 10 to the voltage input terminal Vin. If yes, the second reverse current monitoring circuit 13 will immediately turn off the power transistor 10 to stop the reverse current Ir. In particular, the second reverse current monitoring circuit 13 detects a larger reverse current Ir than does the first reverse current monitoring circuit 12.

More specifically, the second reverse current monitoring circuit 13 includes a second comparator 130 (OP2) that has a first input coupled to receive a first voltage on the voltage output terminal Vout, a second input coupled to receive a second voltage on the voltage input terminal Vin, and a single-ended output coupled to the control terminal G of the power transistor 10. The second comparator 130 compares the first voltage to the second voltage, and outputs an OFF signal via its output to the control terminal G of the power transistor 10 to turn off the power transistor 10 only when a voltage difference between the first and second voltages is larger than a second predetermined voltage value and therefore is identified by the second comparator 130. In particular, the second predetermined voltage value which can be noticed or identified by the second comparator 130 of the second reverse current monitoring circuit 13 is larger than the first predetermined voltage value which can be noticed or identified by the first comparator 120 of the first reverse current monitoring circuit 12. In other words, the second comparator 130 detects a higher voltage difference, such as more than 100 mV, than does the first comparator 120. Thus, if an extremely large reverse current Ir is so large that a voltage difference between the voltage output terminal Vout and the voltage input terminal Vin is larger than the second predetermined voltage value, such as 100 mV, which the second comparator 130 can notice or identify, then the second reverse current monitoring circuit 13 will send out an OFF signal from the output of the second comparator 130 in order to immediately turn off the power transistor 10, thereby blocking the extremely large reverse current Ir.

As illustrated above, the power switch circuit 1 can not only block the reverse current Ir from flowing to the power source which is coupled to the voltage input terminal Vin for protection of the interior electronic components, but also avoid malfunction caused by a noise or any transient current.

Figure 5:
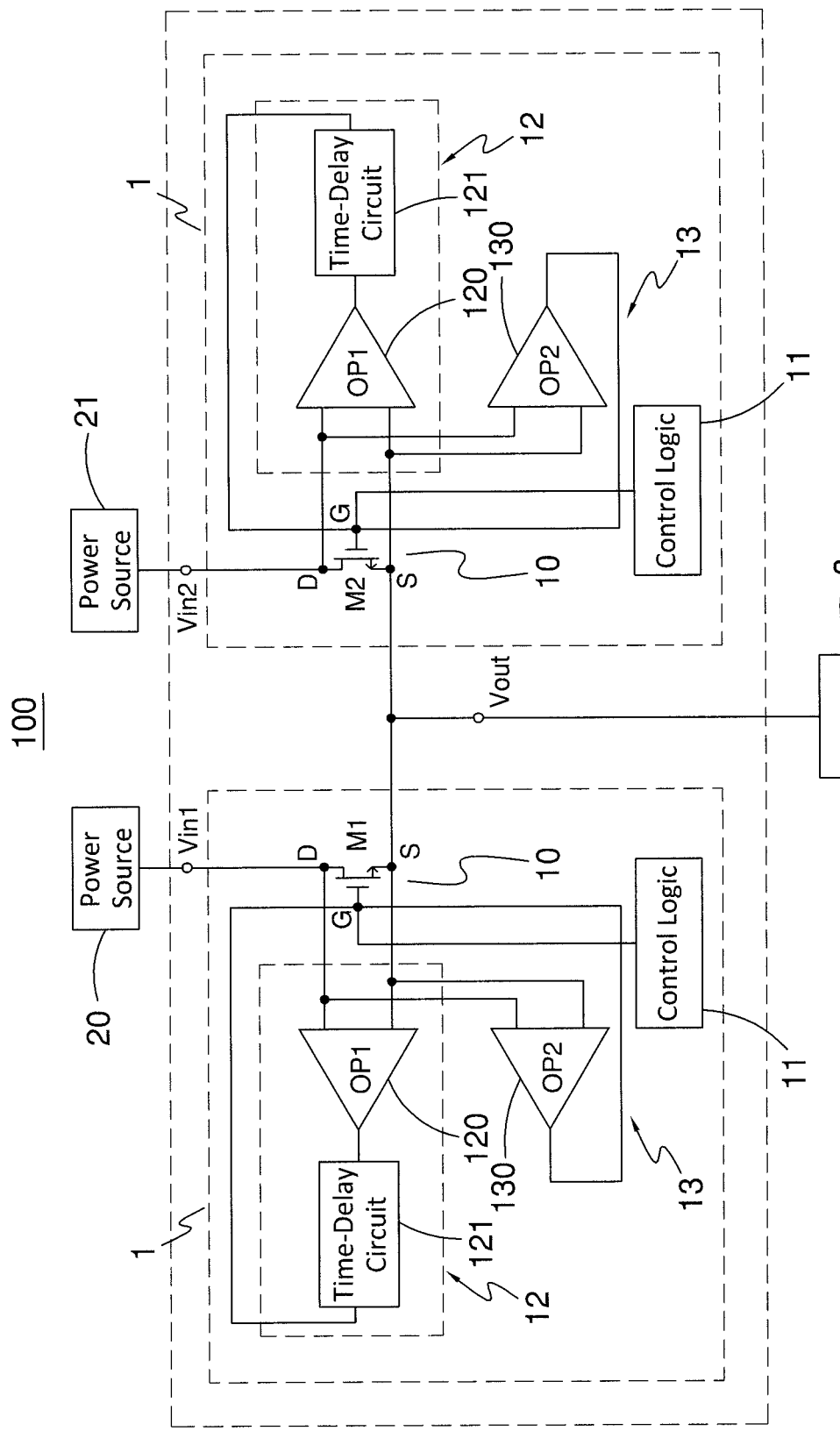
FIG. 5 is a block diagram of a power supply according to the first embodiment of the present invention.

FIG. 5 illustrates a block diagram of a power circuit 100 according to a first embodiment of the invention. The power circuit 100 includes two power switch circuits 1, each of which is as recited above, to provide control the power transfer from the two power sources 20, 21 to the load 3. Specifically, the first voltage input terminal Vin1 of the first, left-side power switch circuit 1 is coupled to the first power source 20 while the second voltage input terminal Vin2 of the second, right-side power switch circuit 1 is coupled to the second power source 21. The voltage output terminals Vout of the two power switch circuits 1 are joined together and coupled to the load 3. The two power source 20, 21 may provide voltages in the range of about 5V to 20V, for example. And the voltages that the two power source 20, 21 provide may be identical or not as required.

For example, the first and second power sources 20, 21 may supply different voltages, for example 5V and 6V respectively. The two control logics 11, such as charge pumps, are in control. At the beginning, the first power transistor 10 (M1) is in the ON-state while the second power transistor 10 (M2) is in the OFF-state. The first power source 20, which is connected to the first voltage input terminal Vin1, supplies power through the power transistor 10 (M1) to the load 3. As can be understood in FIG. 6, before time T1, the output voltage magnitude Vo on the voltage output terminal Vout is slightly less than or equal to the input voltage magnitude V1 on the first voltage input terminal Vin1. Later, at time T1, when the second power transistor 10 (M2) is turned ON, the second power source 21 starts to supply power through the second power transistor 10 (M2) to the load 3. At this moment, since the input voltage magnitude V2 on the second voltage input terminal Vin2 is higher than the input voltage magnitude V1 on the first voltage input terminal Vin1, the current may flow from the second power source 21 through the second voltage input terminal Vin2, the second power transistor 10 (M2), the voltage output terminal Vout, the first power transistor 10 (M1), the first voltage input terminal Vin1, and finally to the first power source 20. Accordingly, after time T1, the input voltage magnitude V1 on the first voltage input tell final Vin1 rises, as depicted in FIG. 6.

At the same time, the output voltage magnitude Vo on the voltage output terminal Vout also rises due to the powering of the second power source 21. In contrast, the input voltage magnitude V2 on the second voltage input terminal Vin2 drops because a portion of the current coming from the second power source 21 goes to the first power source 20. Subsequently, at time T2, the voltage difference between output voltage magnitude Vo and the input voltage magnitude V1 is larger than the first predetermined voltage value, such as 20 mV. That is, the voltage difference is sufficiently large to be identified by the first comparator 120 (OP1), and therefore the first comparator 120 sends a reverse current indicator via its output to the time-delay circuit 121. Thus, at time T2, the time-delay circuit 121 starts to count for a predetermined period of time, such as 5 ms, which ends at time T3. It is understood that, if the first comparator 120 (M1), at time T3, remains sending the reverse current indicator, it is deemed that the current flowing through the first power transistor 10 (M1) to the voltage input terminal Vin is indeed the reverse current Ir, which is supposed to be blocked, and is not a noise or any other transient current. Accordingly, the time-delay circuit 121 will immediately send out a shutdown signal to the first power transistor 10 (M1) at time T3 to turn off the first power transistor 10 (M1) and stop the reverse current Ir from further flowing to the voltage input terminal Vin. As shown in FIG. 6, after time T3, the input voltage magnitude V1 on the first voltage input terminal Vin1 drops back to its original value. The input voltage magnitude V2 on the second voltage input terminal Vin2 rises back to its original value because the second power source 21 is no longer supplying power to the first voltage input terminal Vin1. And the output voltage magnitude Vo continues to rise and finally be slightly less or equal to the input voltage magnitude V2 on the second voltage input terminal Vin2 because the second power source 21 coupled to the second voltage input terminal Vin2 keeps supplying power through the second power transistor 10 (M2) to the load 3.

Figure 6:
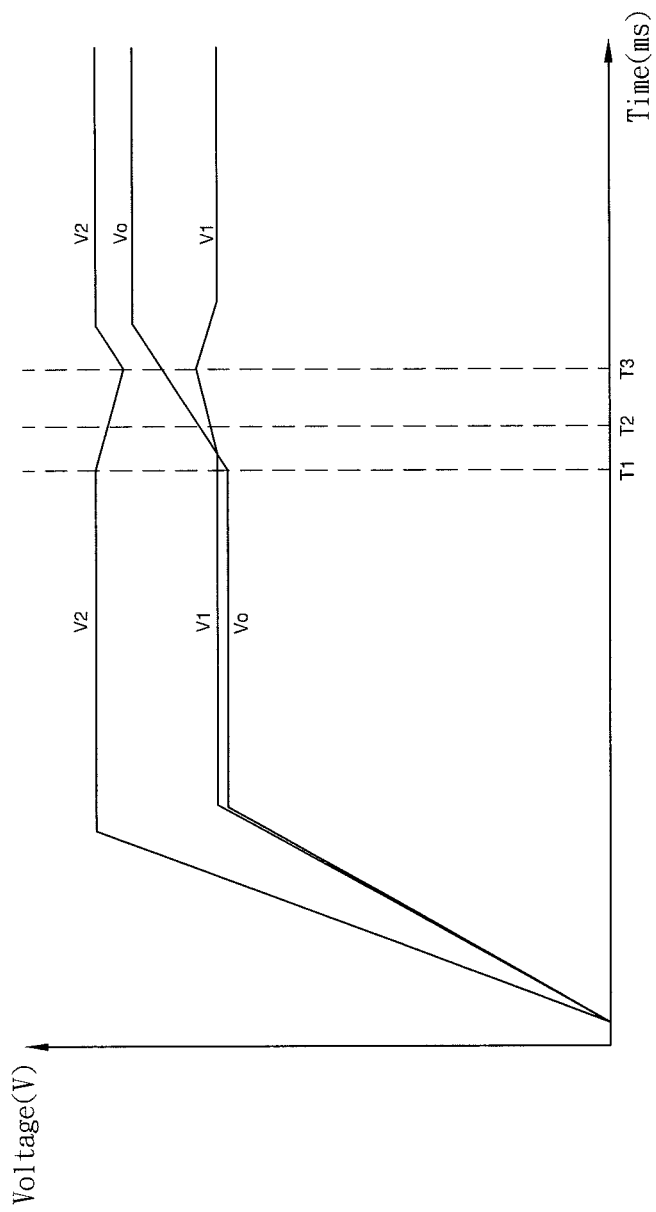
FIG. 6 is a graph of voltage vs. time in the power supply shown in FIG. 5 when a voltage difference between the two power sources 20, 21 is relative less.

As can be seen in FIG. 6, when the voltage difference between the first and second power sources 20, 21 is not sufficiently large (or the reverse current Ir is not sufficiently large), the voltage difference between the output voltage magnitude Vo and the input voltage magnitude V1 at time T3 is less than a minimum voltage, such as 101 mV, which the second comparator 130 (OP2) can detect or perceive. Thus, the second comparator 130 (OP2) will not send any signals for turning off the power transistor 10 (M1). Accordingly, the OFF-state of the power transistor 10 (M1) is actually caused by the first reverse current monitoring circuit 12, rather than the second reverse current monitoring circuit 13.

Figure 7:
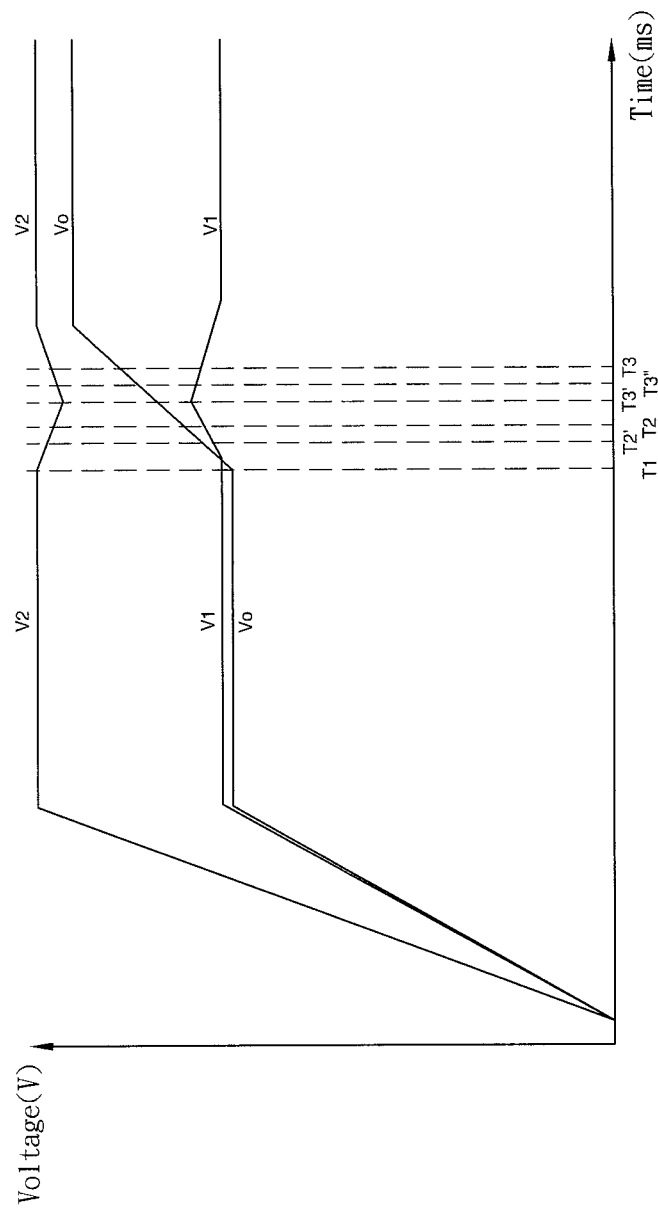
FIG. 7 is a graph of voltage vs. time in the power supply shown in FIG. 5 when a voltage difference between the two power sources 20, 21 is relative larger.

As shown in FIGS. 5 and 7, in another case, the first and second power sources 20, 21 supply different voltages, for example 5V and 7V respectively, and the voltage difference between the first and second power sources 20, 21 is now larger than that shown in FIG. 6. The two control logics 11 are still in control. At the beginning, the first power transistor 10 (M1) is in the ON-state while the second power transistor 10 (M2) is in the OFF-state. The first power source 20 supplies power through the power transistor 10 (M1) to the load 3. As can be understood in FIG. 7, before time T1, the output voltage magnitude Vo on the voltage output terminal Vout is slightly less than or equal to the input voltage magnitude V1 on the first voltage input terminal Vin1. Later, at time T1, when the second power transistor 10 (M2) is turned ON, the second power source 21 starts to supply power through the second power transistor 10 (M2) to the load 3. At this moment, since the input voltage magnitude V2 on the second voltage input terminal Vin2 is larger than the input voltage magnitude V1 on the first voltage input terminal Vin1, the current may flow from the second power source 21 through the second voltage input terminal Vin2, the second power transistor 10 (M2), the voltage output terminal Vout, the first power transistor 10 (M1), the first voltage input terminal Vin1, and finally to the first power source 20. Accordingly, after time T1, the input voltage magnitude V1 on the first voltage input terminal Vin1 rises, as depicted in FIG. 7.

In the meantime, the output voltage magnitude Vo on the voltage output terminal Vout also rises due to the powering of the second power source 21. In contrast, the input voltage magnitude V2 on the second voltage input terminal Vin2 drops because the second power source 21 may supply power to the first voltage input terminal Vin1.

It is noted again that the voltage difference between the first and second power sources 20, 21 is now larger than that shown in FIG. 6. Thus, as shown in FIG. 7, before time T2, for example at time T2', the voltage difference between output voltage magnitude Vo and the input voltage magnitude V1 is larger than the first predetermined voltage value, such as 20 mV, and therefore can be detected or identified by the first comparator 120 (OP1). Thus, at time T2', the first comparator 120 (OP1) sends a reverse current indicator via its output to the time-delay circuit 121. Upon reception of the reverse current indicator, the time-delay circuit 121 starts to count for a predetermined period of time, such as 5 ms, which will end at time T3". Subsequently, at time T3', the voltage difference between output voltage magnitude Vo and the input voltage magnitude V1, for example 101 mV, is too large to be identified by the first comparator 120 (OP1), but is larger than the second predetermined voltage value, such as 100 mV, and therefore can be detected or identified by the second comparator 130 (OP2). At this time, the reverse current Ir at time T3' is too large that it may immediately damage the electronic components of the power source 20. For this, the second comparator 130 (OP2) will immediately send an OFF signal via its output to the control terminal G of the power transistor 10 to turn off the power transistor 10, thereby blocking the extremely large reverse current Ir and protecting the electronic components of the power source 20 from damage. Note also that, at time T3', the counting process of the time-delay circuit 121 is not finished yet, and thus the time-delay circuit 121 does not send out the shutdown signal. However, at this time, since the power transistor 10 (M1) has been turned off by the second comparator 130 (OP2), no reverse current Ir will flow to the voltage input terminal Vin.

After time T3', the input voltage magnitude V1 on the first voltage input terminal Vin1 will drop back to its original value. The output voltage magnitude Vo continues to rise and finally be slightly less or equal to the input voltage magnitude V2 on the second voltage input terminal Vin2 because the second power source 21 keeps supplying power through the second power transistor 10 (M2) to the load 3. And the input voltage magnitude V2 on the second voltage input terminal Vin2 will rise back to its original value because the second power source 21 is no longer supplying power to the first voltage input terminal Vin1.

It is also noted that, even though at time T3", the time-delay circuit 121 may send out a shutdown signal to the power transistor 10 (M1) as the counting is complete; however, earlier than that, the power transistor 10 (M1) has already been turned off by the second comparator 130 (OP2). Consequently, in the case where the voltage difference between the first and second power sources 20, 21 is larger than that shown in FIG. 6, the OFF-state of the power transistor 10 (M1) is in fact caused by the second reverse current monitoring circuit 13, rather than the first reverse current monitoring circuit 12.

Referring again to FIG. 5, the first and second power switch circuits 1 in the power circuit 100 are identical to each other. Thus, it is understood that if the input voltage magnitude V1 on the first voltage input terminal Vin1 is replaced by 6 V or 7 V, and the input voltage magnitude V2 on the second voltage input terminal Vin2 is replaced by 5 V, then the power circuit 100 will perform the same operation as described above, except that the reverse current Ir may occur and flow through the power transistor 10 (M2) to the second voltage input terminal V2, and will be blocked by the first and second comparators 12, 13 of the second, right-side power switch circuit 1.

Figure 8:
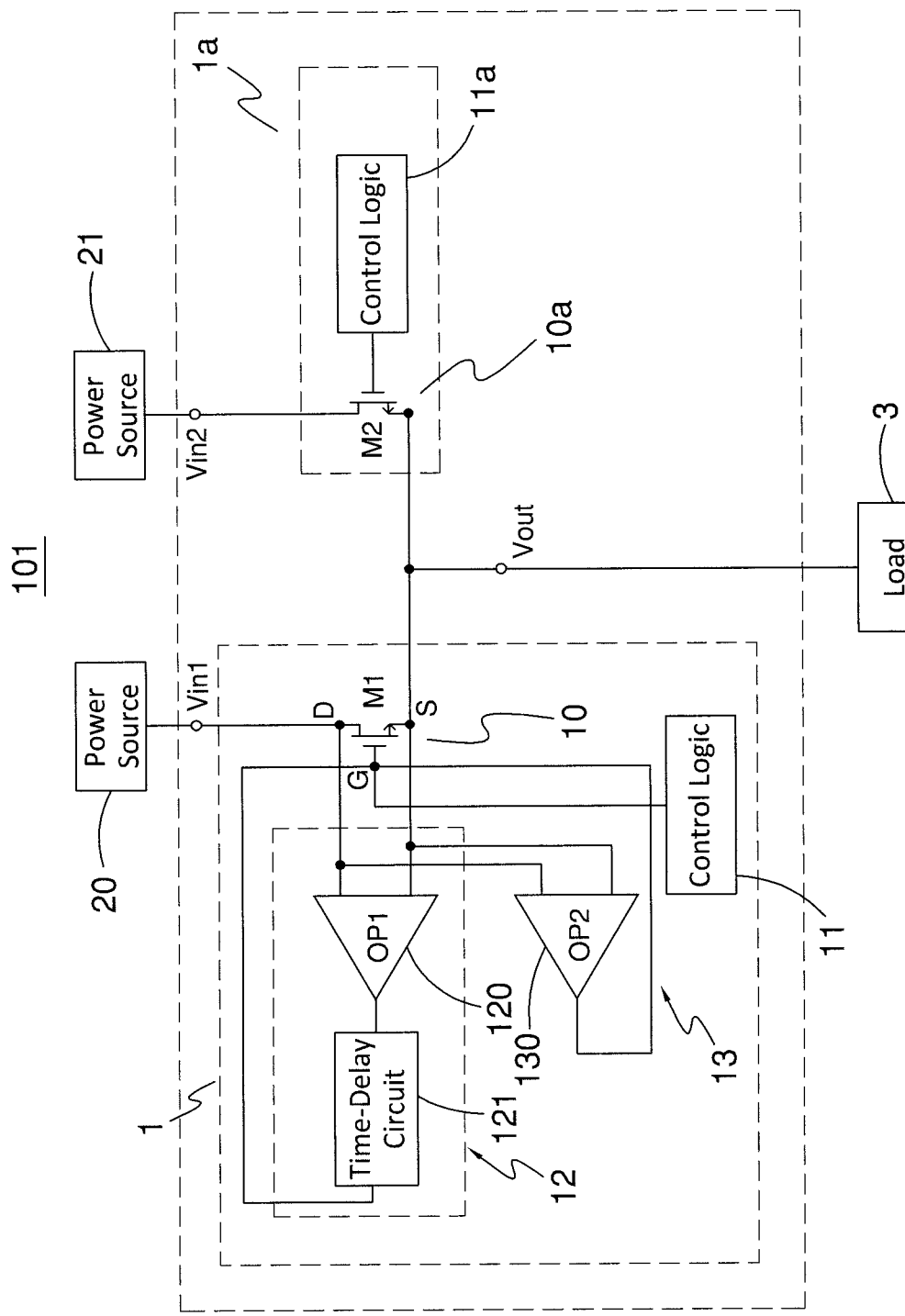
FIG. 8 is a block diagram of a power supply according to a second embodiment of the present invention.

FIG. 8 illustrates a block diagram of a power circuit 101 according to a second embodiment of the invention. The power circuit 101 includes a first power switch circuit 1 as recited above and a second power switch circuit 1a to control power transfer from the two power sources 20, 21 to the load 3. The power circuit 101 operates in a similar way to the power circuit 100, except that the second power switch 1a employs a control logic 11a to control a power transistor 10a (M2) without the first and second reverse current monitoring circuits 12, 13 for reverse current control. The control logic 11 may be a charge pump or other control circuits, as mentioned above. Since there is no reverse current blocking mechanism in the second power switch circuit 1a, the power circuit 101 can perform a reverse current blocking function with the first power switch 1 only when the voltage of the second power source 21 is larger than that of the first power source 20.

Figure 9:
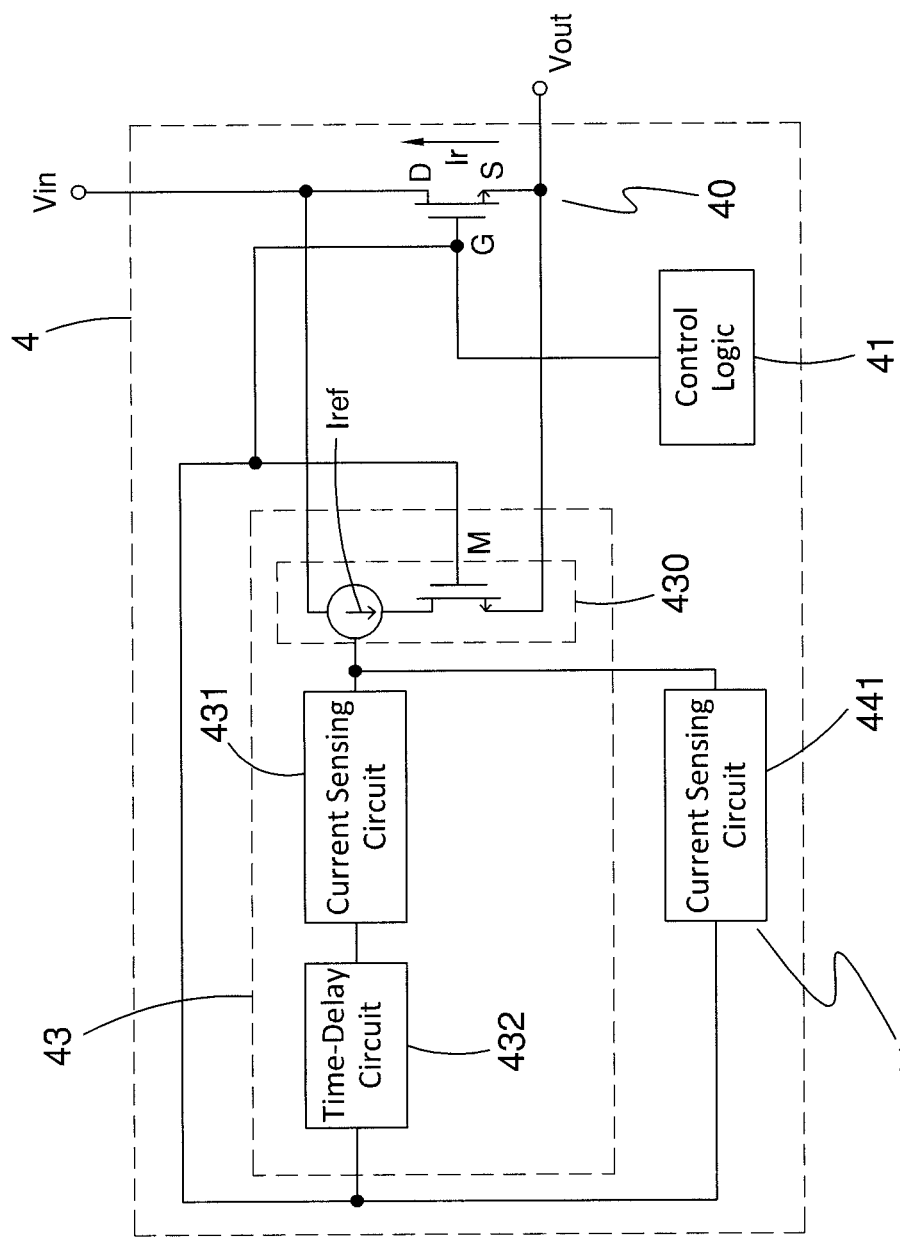
FIG. 9 is a block diagram of a power switch circuit according to the second embodiment of the present invention.

Referring to FIG. 9, there is shown a second embodiment of the power switch circuit 4, which generally includes a voltage input terminal Vin, a voltage output terminal Vout, a power transistor 40, a control logic 41, a first reverse current monitoring circuit 43, and a second reverse current monitoring circuit 44. The voltage input terminal Vin, the voltage output terminal Vout, the power transistor 40, and the control logic 41 are substantially identical to the voltage input terminal Vin, the voltage output terminal Vout, the power transistor 10, and the control logic 11 shown in FIG. 4 respectively, and accordingly, is not further detailed herein.

In this embodiment, the first reverse current monitoring circuit 43 includes a current detecting circuit 430, a first current sensing circuit 431, and a time-delay circuit 432. The current detection circuit 430 is coupled to the power transistor 40 for detecting a current flowing through the power transistor 40. Specifically, the current detection circuit 430 includes a reference current source (Iref) and a power transistor M. The power transistor M and the power transistor 40 are identical to each other and together form a current mirror circuit. In this manner, the current detection circuit 430 can obtain the current flowing through the power transistor 40.

The first current sensing circuit 431 has an input coupled to the current detection circuit 430 and an output coupled to an input of the time-delay circuit 432. Only when the current flowing through the power transistor 40 to the voltage input terminal Vin is detected by the current detection circuit 430 and is larger than a first preset current value, the first current sensing circuit 431 sends a reverse current indicator to the time-delay circuit 432, indicating that a reverse current Ir is flowing through the power transistor 40 to the voltage input terminal Vin. The time-delay circuit 432 has an output coupled to a control terminal G of the power transistor 40, and only when the first current sensing circuit 431 persists outputting the reverse current indicator for a predetermined period of time, the time-delay circuit 432 sends a shutdown signal to the control terminal G of the power transistor 40 to turn off the power transistor 40. As explained above, this can stop the reverse current Ir from further flowing to the voltage input terminal Vin, protect the interior electronic components of the power source from damage, and avoid the misjudgment.

The second reverse current monitoring circuit 44 includes only a second current sensing circuit 441 that has an input coupled to the current detection circuit 430, and an output coupled to the control terminal G of the power transistor 40. Moreover, the second current sensing circuit 44 will send an OFF signal to the control terminal G of the power transistor 40 to turn off the power transistor 40 only when the current flowing through the power transistor 40 to the voltage input terminal Vin is detected by the current detection circuit 430 and is larger than a second preset current value. In particular, the second preset current value which can be identified by the second current sensing circuit 441 of the second reverse current monitoring circuit 44 is larger than the first preset current value which can be identified by the first current sensing circuit 431 of the first reverse current monitoring circuit 43. Compared to the first reverse current monitoring circuit 43, the second reverse current monitoring circuit 44 can drive the power transistor 40 to block a relatively larger reverse current Ir.

It should be understood that the power switch circuit 4 may be applied to the aforementioned power circuit 100 or 101 to replace the power switch circuit 1.

Figure 10:
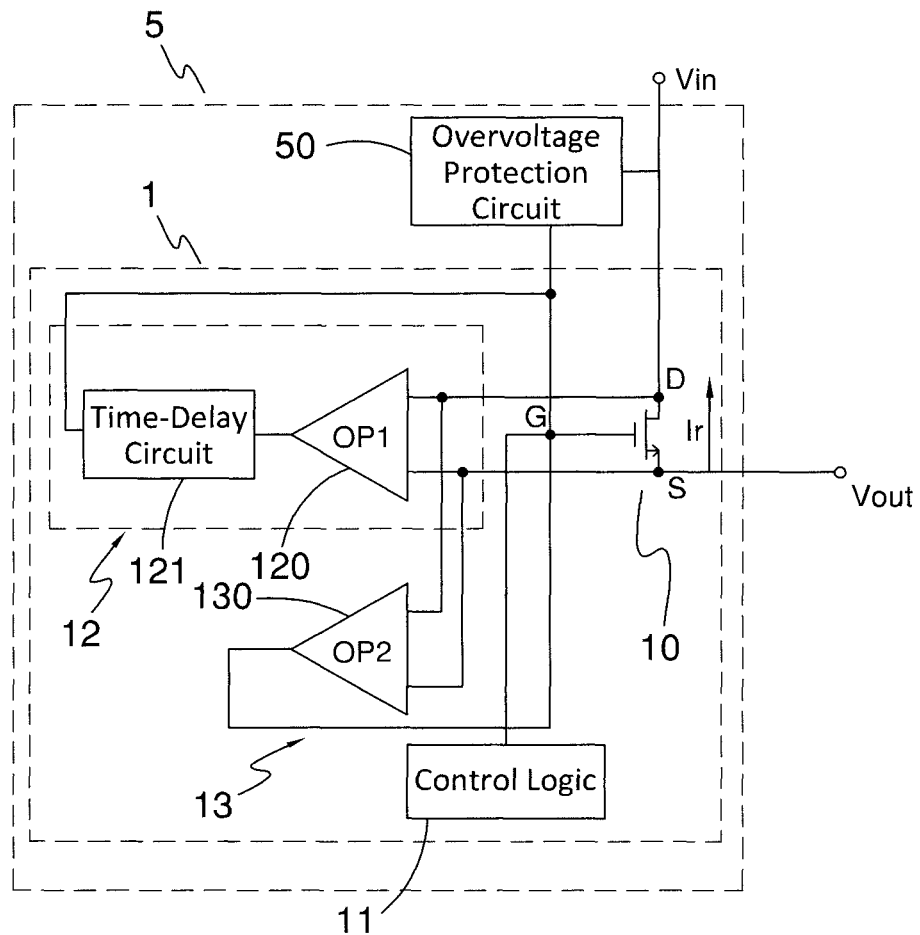
FIG. 10 is a block diagram of a power switch circuit according to a third embodiment of the present invention.

Referring to FIG. 10, there is shown a third embodiment of the power switch circuit 5, which generally includes a circuit 1 (framed by a dotted line) and an overvoltage protection circuit 50. The circuit 1 is identical to the power switch circuit 1 as recited above, and accordingly, is not further detailed herein. Compared to the power switch circuit 1, the power switch circuit 5 further includes the overvoltage protection circuit 50 which is operatively connected between the voltage input terminal Vin and a control terminal G of the power transistor 10. The overvoltage protection circuit 50 is configured to turn off the power transistor 10 only when an input voltage magnitude on the voltage input terminal Vin is detected to be larger than a preset upper limit of voltage value, such as 100 mV or more.

In this embodiment, when the reverse current Ir is too small to be detected by both of the first and second reverse current monitoring circuits 12, 13, the reverse current Ir flowing to the voltage input terminal Vin may still cause the input voltage magnitude V1 on the voltage input terminal Vin to rise gradually. The overvoltage protection circuit 50 can detect when the input voltage magnitude V1 on the voltage input terminal Vin exceeds the preset upper limit of voltage value, and send an OFF signal to the control terminal G of the power transistor 10 to have the power transistor 10 turned off, thereby blocking the reverse current Ir from flowing into the voltage input terminal Vin, and preventing the input voltage magnitude V1 on the voltage input terminal Vin from reaching a voltage value that can damage the electronic components of the power source coupled to the voltage input terminal Vin.

It should be understood that the overvoltage protection circuit 50 may be applied to the aforementioned power switch circuit 4 to provide the overvoltage protection function.

Figure 11:
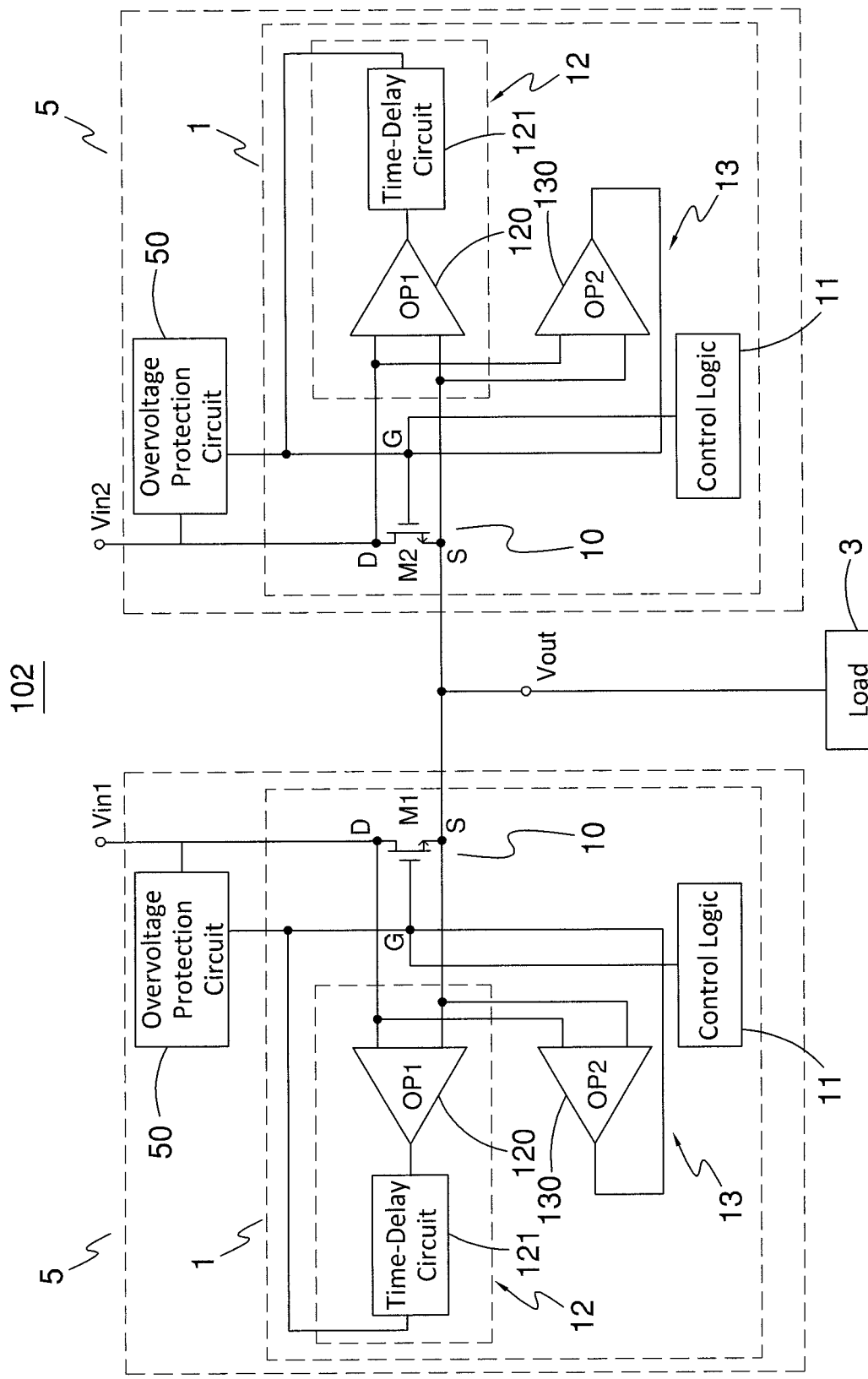
FIG. 11 is a block diagram of a power supply according to the third embodiment of the present invention.

FIG. 11 illustrates a block diagram of a power circuit 102 according to a third embodiment of the invention. The power circuit 102 includes two power switch circuits 5 as recited above to control power transfer from two power sources (not shown) to a load 3. As described above, the power circuit 102 blocks not only the larger reverse current Ir which can be detected by the first or second reverse current monitoring circuit 12 or 13, but also the extremely small reverse current Ir, which has lasted for a long time, before the extremely small reverse current Ir becomes a disaster to the electronic components of the power source.

It should be evident that this disclosure is by way of example and that various changes may be made by adding, modifying or eliminating details without departing from the fair scope of the teaching contained in this disclosure.

What is claimed is:

1. A power switch circuit, comprising:
   a voltage input terminal for being coupled to a power source;
   a voltage output terminal for being coupled to a load;
   a power transistor operatively connected between said voltage input terminal and said voltage output terminal;
   a control logic coupled to a control terminal of the power transistor for controlling operation of the power transistor so as to have the power source supply power to the load via the power transistor;
   a first reverse current monitoring circuit coupled to two connecting terminals of the power transistor and configured to detect whether a reverse current that flows through the power transistor to said voltage input terminal is larger than a first predetermined value for a predetermined period of time; and if yes, the first reverse current monitoring circuit turns off the power transistor
   a second reverse current monitoring circuit coupled to two connecting terminals of the power transistor and configured to detect whether a reverse current that flows through the power transistor to said voltage input terminal is larger than a second predetermined value that is larger than the first predetermined value; and if yes, the second reverse current monitoring circuit immediately turns off the power transistor; and
   a overvoltage protection circuit connected between said voltage input terminal and the control terminal of the power transistor, and configured to turn off the power transistor only when an input voltage magnitude on said voltage input terminal is detected to be larger than a preset upper limit of voltage value, wherein the preset upper limit of voltage value is greater than or equal to the first predetermined value.

2. The power switch circuit as recited in claim 1, wherein the connecting terminals of the power transistor respectively coupled to said voltage input terminal and said voltage output terminal; the first reverse current monitoring circuit includes a first comparator and a time-delay circuit; the first comparator has a first input coupled to receive a first voltage on said voltage output terminal, a second input coupled to receive a second voltage on said voltage input terminal, and a single-ended output coupled to an input of the time-delay circuit; the first comparator compares the first voltage to the second voltage, and sends a reverse current indicator to the time-delay circuit only when a voltage difference between the first and second voltages is larger than the first predetermined value and therefore is identified by the first comparator; the time-delay circuit has an output coupled to the control terminal of the power transistor, and only when the first comparator persists outputting the reverse current indicator for the predetermined period of time, the time-delay circuit sends a shutdown signal to the control terminal of the power transistor to turn off the power transistor.

3. The power switch circuit as recited in claim 2, wherein the second reverse current monitoring circuit includes a second comparator that has a first input coupled to receive a first voltage on said voltage output terminal, a second input coupled to receive a second voltage on said voltage input terminal, and a single-ended output coupled to the control terminal of the power transistor; the second comparator compares the first voltage to the second voltage, and outputs an OFF signal via its output to the control terminal of the power transistor to turn off the power transistor only when a voltage difference between the first and second voltages is larger than the second predetermined value and therefore is identified by the second comparator.

4. The power switch circuit as recited in claim 1, wherein the connecting terminals of the power transistor respectively coupled to said voltage input terminal and said voltage output terminal; the first reverse current monitoring circuit includes a current detecting circuit, a first current sensing circuit, and a time-delay circuit; the current detection circuit is coupled to the power transistor for detecting a current flowing through the power transistor; the first current sensing circuit has an input coupled to the current detection circuit and an output coupled to an input of the time-delay circuit; the first current sensing circuit sends a reverse current indicator to the time-delay circuit only when the current flowing through the power transistor to said voltage input terminal is detected by the current detection circuit and is larger than the first predetermined value; the time-delay circuit has an output coupled to the control terminal of the power transistor and only when the first current sensing circuit persists outputting the reverse current indicator for the predetermined period of time, the time-delay circuit sends a shutdown signal to the control terminal of the power transistor to turn off the power transistor.

5. The power switch circuit as recited in claim 4, wherein the second reverse current monitoring circuit includes a second current sensing circuit that has an input coupled to the current detection circuit, and an output coupled to the control terminal of the power transistor; the second current sensing circuit sends an OFF signal to the control terminal of the power transistor to turn off the power transistor only when the current flowing through the power transistor to said voltage input terminal is detected by the current detection circuit and is larger than the second predetermined value; and wherein the second preset current value which can be identified by the second current sensing circuit of the second reverse current monitoring circuit is larger than the first preset current value which can be identified by the first current sensing circuit of the first reverse current monitoring circuit.

6. A power circuit, comprising two power switch circuits each of which is as recited in claim 1, wherein said voltage input terminal of one of the two power switch circuits is to be coupled to a first power source while said voltage input terminal of the other power switch circuit is to be coupled to the second power source; and said voltage output terminals of the two power switch circuits are joined together to be coupled to a load.

7. A power circuit, comprising two power switch circuits each of which is as recited in claim 2, wherein said voltage input terminal of one of the two power switch circuits is to be coupled to a first power source while said voltage input terminal of the other power switch circuit is to be coupled to the second power source; and said voltage output terminals of the two power switch circuits are joined together to be coupled to a load.

8. A power circuit, comprising two power switch circuits each of which is as recited in claim 3, wherein said voltage input terminal of one of the two power switch circuits is to be coupled to a first power source while said voltage input terminal of the other power switch circuit is to be coupled to the second power source; and said voltage output terminals of the two power switch circuits are joined together to be coupled to a load.

9. A power circuit, comprising two power switch circuits each of which is as recited in claim 4, wherein said voltage input terminal of one of the two power switch circuits is to be coupled to a first power source while said voltage input terminal of the other power switch circuit is to be coupled to the second power source; and said voltage output terminals of the two power switch circuits are joined together to be coupled to a load.

10. A power circuit, comprising two power switch circuits each of which is as recited in claim 5, wherein said voltage input terminal of one of the two power switch circuits is to be coupled to a first power source while said voltage input terminal of the other power switch circuit is to be coupled to the second power source; and said voltage output terminals of the two power switch circuits are joined together to be coupled to a load.

11. A power circuit, comprising a first power switch circuit as recited in claim 1 and a second power switch circuit, wherein said voltage input terminal of the first power switch circuit is to be coupled to a first power source while said voltage input terminal of the second power switch circuit is to be coupled to a second power source; and said voltage output terminal of the first power switch circuit and a voltage output terminal of the second power switch are joined together to be coupled to a load.

12. A power circuit, comprising a first power switch circuit as recited in claim 2 and a second power switch circuit, wherein said voltage input terminal of the first power switch circuit is to be coupled to a first power source while said voltage input terminal of the second power switch circuit is to be coupled to a second power source; and said voltage output terminal of the first power switch circuit and a voltage output terminal of the second power switch are joined together to be coupled to a load.

13. A power circuit, comprising a first power switch circuit as recited in claim 3 and a second power switch circuit, wherein said voltage input terminal of the first power switch circuit is to be coupled to a first power source while said voltage input terminal of the second power switch circuit is to be coupled to a second power source; and said voltage output terminal of the first power switch circuit and a voltage output terminal of the second power switch are joined together to be coupled to a load.

14. A power circuit, comprising a first power switch circuit as recited in claim 4 and a second power switch circuit, wherein said voltage input terminal of the first power switch circuit is to be coupled to a first power source while said voltage input terminal of the second power switch circuit is to be coupled to a second power source; and said voltage output terminal of the first power switch circuit and a voltage output terminal of the second power switch are joined together to be coupled to a load.

15. A power circuit, comprising a first power switch circuit as recited in claim 5 and a second power switch circuit, wherein said voltage input terminal of the first power switch circuit is to be coupled to a first power source while said voltage input terminal of the second power switch circuit is to be coupled to a second power source; and said voltage output terminal of the first power switch circuit and a voltage output terminal of the second power switch are joined together to be coupled to a load.

* * * * *